United States Patent
Phillips et al.

[15] 3,706,419
[45] Dec. 19, 1972

[54] RESIN CRUSHER

[72] Inventors: Michael Phillips, North Brunswick; Victor A. Jurow, Freehold, both of N.J.

[73] Assignee: L. A. Dreyfus Company, South Plainfield, N.J.

[22] Filed: Jan. 21, 1971

[21] Appl. No.: 108,409

[52] U.S. Cl. .................... 214/220, 214/300, 214/311
[51] Int. Cl. .................................................. B02c 4/02
[58] Field of Search......214/300, 302, 308, 306, 311; 222/101, 214; 241/220, 221, 239–241; 100/144, 177, DIG. 2; 221/277

[56] References Cited

UNITED STATES PATENTS

| | | | |
|---|---|---|---|
| 3,279,357 | 10/1966 | Farmer | 100/177 X |
| 1,783,373 | 12/1930 | Borton | 241/240 |
| 1,434,417 | 11/1922 | Ward | 100/DIG. 2 |
| 2,957,604 | 10/1960 | Goldman | 221/277 |

FOREIGN PATENTS OR APPLICATIONS

| | | | |
|---|---|---|---|
| 863,249 | 3/1961 | Great Britain | 241/241 |

Primary Examiner—Stanley H. Tollberg
Attorney—Le Blanc & Shur

[57] ABSTRACT

Disclosed is a method and apparatus for emptying containers filled with a resin or other friable material having a tendency to stick to the container walls. The containers have their tops removed, are inverted, and fed into the space between a stationary outer cylinder and a rotatable inner cylinder. These containers are squeezed between the cylinders as they rotate and progress approximately 315° about the periphery of the inner cylinder, so that the friable material is cracked and broken up and falls by gravity from the open, inverted top of the container.

11 Claims, 6 Drawing Figures

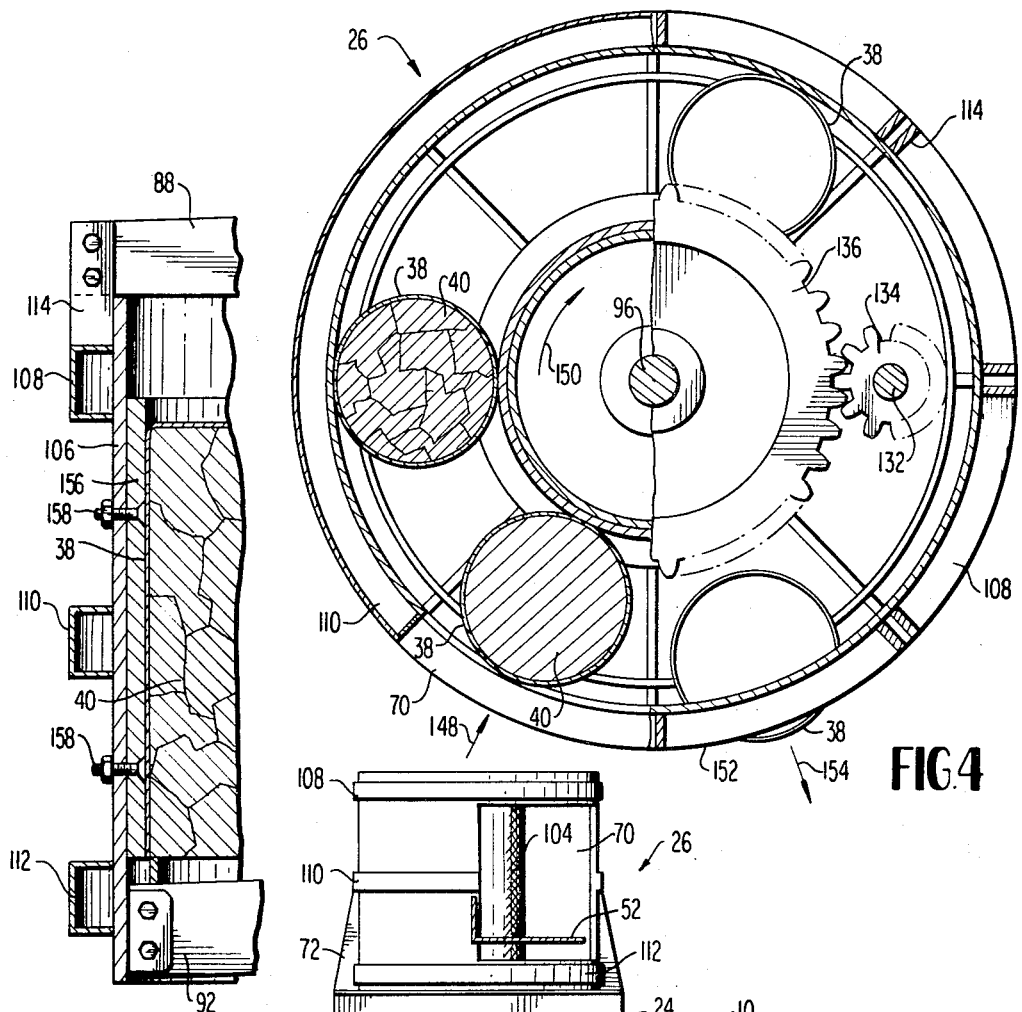
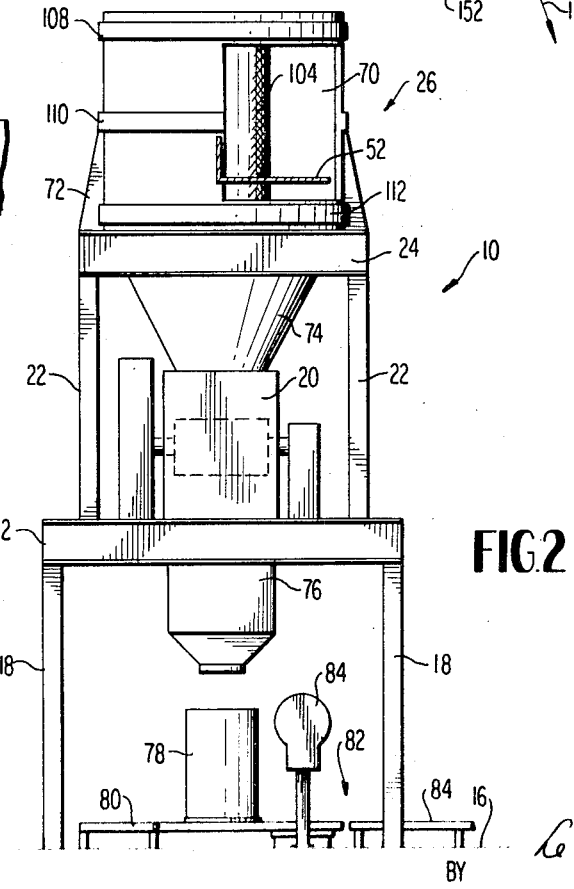
FIG.6
FIG.4
FIG.2

INVENTORS
MICHAEL PHILLIPS
VICTOR A. JUROW

RESIN CRUSHER

This invention relates to a method and apparatus for crushing or cracking resins and more particularly to a rotatable drum and feed assembly for cracking and removing solid resin from the cylindrical fiber drums commonly used as shipping containers in which the resin is transported. Important features of the invention include the removal of the resin from the shipping container in a rapid, simple and inexpensive manner and yet in a way that is both sanitary and safe for the employees operating the equipment.

As is well known, various resin materials are used in relatively large quantities for a wide variety of purposes and chemical processes, including the production of paints, adhesives, and many other materials. In addition, some resins, such as polyvinyl acetate, glycerol ester gums, and others, are used in the formulation of chewing gum base. While the present invention is applicable to a large number of resins used for a variety of purposes, it will be described in conjunction with a resin such as polyvinyl acetate used to form chewing gum base.

Resins such as polyvinyl acetate and the like are often supplied from the manufacturer in cylindrical fiber drums closed at each end by a fiber cover or end cap secured by a thin galvanized metal band or rim. At the manufacturing site, the resin is conventionally poured into the fiber drum in the molten state where it firmly adheres to the walls of the drum upon solidification. The drums are relatively large and when filled with resin are quite heavy and because of adherence to the drum walls, difficulties have been encountered in emptying the drums when it is desired to use the resin.

The resin is solid at room temperature (or as is sometimes the case when chilled to about 50° F), but is very brittle or friable and will shatter or crack when crushed or struck with sufficient force. However, even after it has been cracked or fractured, it is necessary that the resulting particulate resin material be used promptly since otherwise the resin tends to resolidify or "block up" if left to sit overnight. For this reason, it is seldom practical or economical to crush or particulate the resin material any substantial length of time prior to its incorporation into the desired formulation.

Existing methods and apparatus for removing resin from the shipping containers require cutting, piercing or hammering the fiber drum to fracture the resin within, either with hand tools or by way of power-operated crushers. This results in a safety problem because such a procedure is a hazard to workers in the area due to flying particles of resin. An additional problem is that the blades or edges of the tools used also impress or embed fiberboard into the resin as contamination. Further contamination occurs from rust, oils, blade chips, and the like from the open press (or manual equipment) used to fracture the resin.

The present invention avoids these and other difficulties by passing the solid resin-filled fiberboard cylindrical container into a rotary planetary crusher which exerts a uniform rotary compression on the container, fracturing its contents. In the present invention, the container cover is first removed, the drum is inverted and passed into the rotary crusher where the resin contents are crushed and fractured and free to fall from the inverted open top of the container by gravity into a suitable hopper (and preferably secondary crusher) for mixture with other materials used in formulating a chewing gum base. An evenly distributed compressive force is exerted over the length of the container to compress the fiber container along a continuously changing diameter, forcing the drum and its contents to assume a constantly changing elliptical configuration. The brittle resin shatters under the deforming force while the flexible fiber drum yields without rupture and, in many instances, is suitable for reuse.

The fiber container with the lid or top removed is inverted and inserted between two steel cylinders. The outer steel cylinder is stationary, while the inner cylinder rotates with the fiber drum container in between assuming the roll of a planet gear or of the roller in a roller bearing. The distance separating the surfaces of the inner and outer steel cylinders is slightly less than the diameter of the fiber drum to compress the drum at the contacting diameter. In addition, the surfaces of the two steel cylinders are preferably roughened to insure frictional engagement with the outer surface of the drum so that the drum container is rotated and advanced through the crusher.

In order that container drums of different sizes may be handled, the crusher is preferably built with surface separation adequate to accommodate the largest drum and different thickness linings are secured in place to the outer cylinder in such a manner as to allow easy interchangeability of the curved steel sections to provide different radial distances between the inner and outer steel cylinder surfaces.

It is therefore one object of the present invention to provide an improved method and apparatus for cracking friable resin material exhibiting a brittle crystalline-type structure.

Another object of the present invention is to provide an improved method and apparatus for removing solid resin from cylindrical fiber drum shipping containers and other structures to which the resin may adhere.

Another object of the present invention is to provide an arrangement for emptying cylindrical fiber drum containers in a simple, efficient and reliable manner.

Another object of the present invention is to provide a method and apparatus for emptying solid resin-filled fiber drum containers in a manner which is both sanitary and safe.

Another object of the present invention is to provide a method and apparatus for emptying fiber drum containers in such a way that little or no fiberboard is embedded as contamination in the contents of the container.

Another object of the present invention is to provide an arrangement for discharging resin from a cylindrical fiber drum container in which the container is compressed and rotated between relatively moving inner and outer cylindrical walls.

Another object of the present invention is to provide a container unloader in the form of a crusher with relatively movable inner and outer steel walls separated by a radial distance slightly less than the container diameter and having entrance and exit apertures in its outer wall for the introduction of and removal of a container.

These and further objects and advantages of the invention will be more apparent upon reference to the following specification, claims, and appended drawings, wherein:

FIG. 2 is an elevational view showing the crusher and discharge port for the particulate resin after it has been crushed;

FIG. 4 is a horizontal cross section taken along line 4—4 of FIG. 3;

FIG. 6 is a partial vertical section through the crusher similar to that of FIG. 3 showing a removable liner connected to the inner surface of the outer crusher wall.

Figure 1:
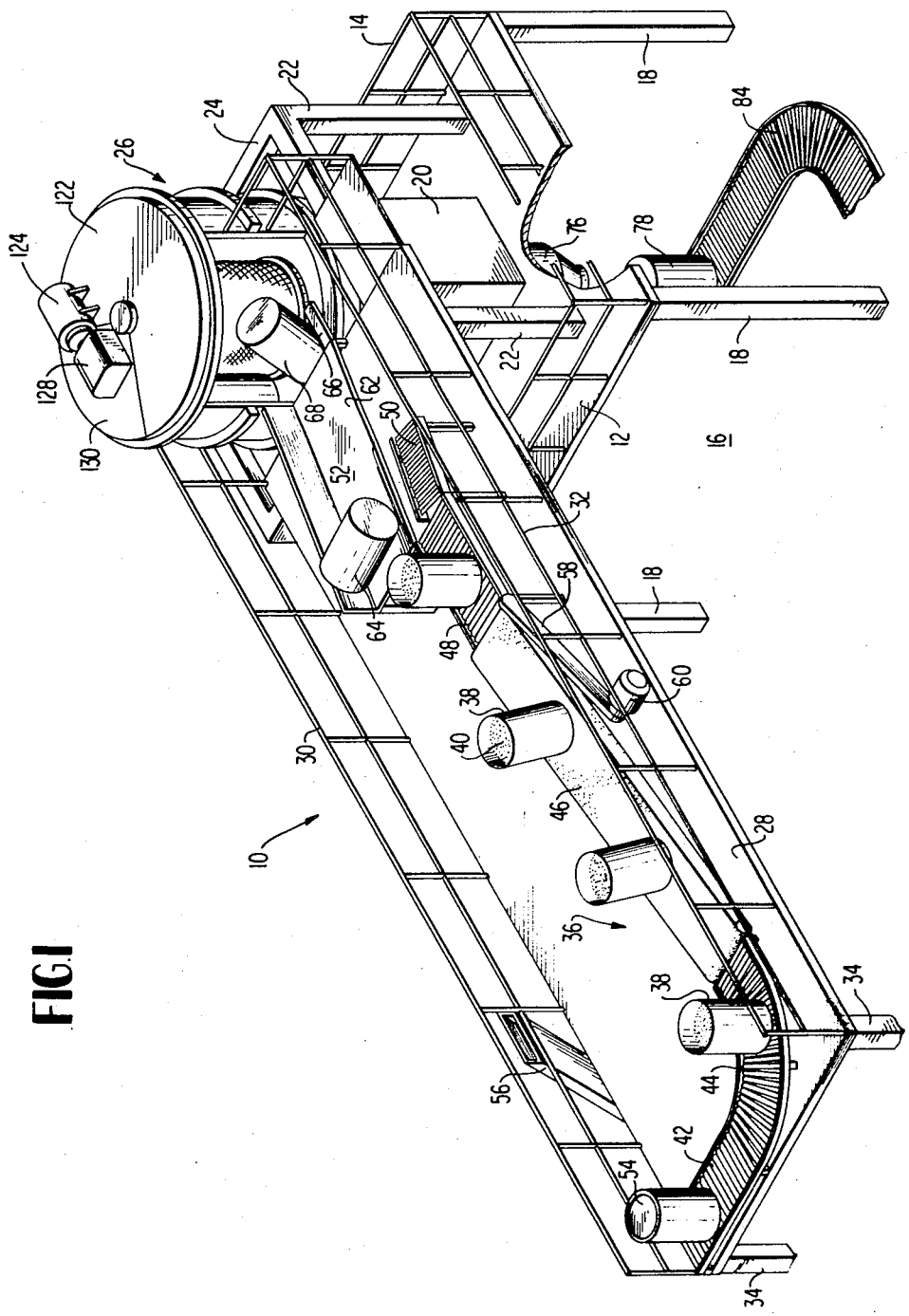
FIG. 1 is a perspective view of an unloading system including a resin crusher constructed in accordance with the present invention.

Referring to the drawings, the novel container emptying system of the present invention is generally indicated at 10 in FIG. 1. The system comprises a lower platform 12 having a metal railing 14 supported from the factory floor 16 by four legs 18. Mounted on lower platform 12 is a conventional roll crusher 20. The crusher 20 per se forms no part of the present invention and, by way of example only, may comprise a single roll crusher of the 18 × 20 Atlas series. Alternatively, a conventional jaw crusher may be substituted for roll crusher 20.

Supported from platform 12 by four legs 22 is a rectangular frame 24. Mounted on this frame by suitable brackets (not shown) is a planetary resin crusher, generally indicated at 26. Frame 24 also supports one end of an upper platform 28 having metal railings 30 and 32. The other end of upper platform 28 is supported from the factory floor by a pair of longer legs 34.

Upper platform 28 carries a container feed system, generally indicated at 36, by means of which a series of containers 38 filled with resin 40 are fed to the planetary crusher 26, more fully described below. The feed system 36 comprises a horizontal roller section 42, a downwardly inclined roller section 44, an upwardly inclined driven belt 46, a horizontal roller section 48, a short offset roller section 50, and a planetary crusher feed chute 52.

Containers 38 are deposited in pairs on roller section 42 from the factory floor by a suitable forklift (not shown). The container covers, such as the cover 54, are manually removed by an operator on platform 28 and are placed in a discharge chute 56 where they fall into a suitable receptacle (not shown). The containers with the tops removed are manually propelled along roller sections 42 and 44 onto belt 46 driven by way of a chain drive 58 from a belt drive motor 60. The containers are deposited by the driven belt 46 onto roller section 48 where they are again manually propelled by the operator onto offset roller section 50. The containers are then pushed by the operator over edge 62 onto downwardly inclined feed chute 52 so that they fall into the horizontal position illustrated at 64. The cylindrical containers are then rolled downwardly along feed chute 52 until their lower or bottom ends roll over a bar 66 at the end of chute 52 causing the containers to tip over into a completely inverted position with the lower end down for entry into planetary pressure 26. Further inversion of a container by engagement of the bottom end with the bar 66 is illustrated at 68 in FIG. 1.

FIG. 2 shows an end view of the unloading system 10 of FIG. 1. The upper platform has been omitted in FIG. 2 for the sake of clarity. In this view, the feed chute 52 is shown as communicating with an entranceway or feed aperture 70 in the planetary crusher 26 through which the containers enter the crusher. The planetary crusher is supported from frame 24 by brackets, such as those illustrated at 72. The crushed resin falls from the bottom of planetary crusher 26 through a hopper 74 into roll crusher 20 where the resin is crushed into smaller or finer particles. From roll crusher 20, the particulate resin material is passed through a metered discharge hopper 76 where metered quantities of the resin are discharged into a mixing container 78. This container is illustrated as supported on a roller section 80 and, when filled with the desired quantity of resin, is manually propelled along roller section 80 to a weighing station 82, including weighing scale 84, where the weight of the container and its contents is ascertained. Mixing container 78 is then manually propelled along a further section of roller track 84 to the next stage of the gum base formulating operation.

While the container unloading method and apparatus of the present invention is applicable to a wide variety of resinous materials usable in many different types of processes, the present invention will be described in conjunction with the removal of polyvinyl acetate for use in formulating chewing gum base. This resin is received from the manufacturer at the chewing gum base plant in containers 38 which are made of fiberboard and have closures or end caps also made of fiberboard and secured to the tubular body of the container by a thin galvanized rim or ring. By way of example only, the fiber drum containers have an outside diameter of approximately 19⅝ inches (nominal 20 inch drum) and are 37 inches high. The containers are filled with polyvinyl acetate which is poured into the containers at the manufacturing site in molten form such that the containers and their contents have a total weight in the neighborhood of 450 pounds. The resin is in the form of a solid crystalline structure that is friable and breaks up and cracks when subjected to compressive stresses. As illustrated in FIG. 1, a small layer at the top of the container may be broken up due to handling, but the principal portion of the resin within the container is in solid form at room temperature and tends to adhere to the fiber walls of the container drum. It is understood that for some resins it may be desirable to slightly chill the drums prior to opening to a temperature such as about 50° F to impart the desired brittleness to the resin, but with most resins this is not necessary. In addition, even though the resin tends to readily crack or fracture under compressive stresses, it will "block up" overnight and reassume a solid state when left undisturbed for several hours.

Figure 3:
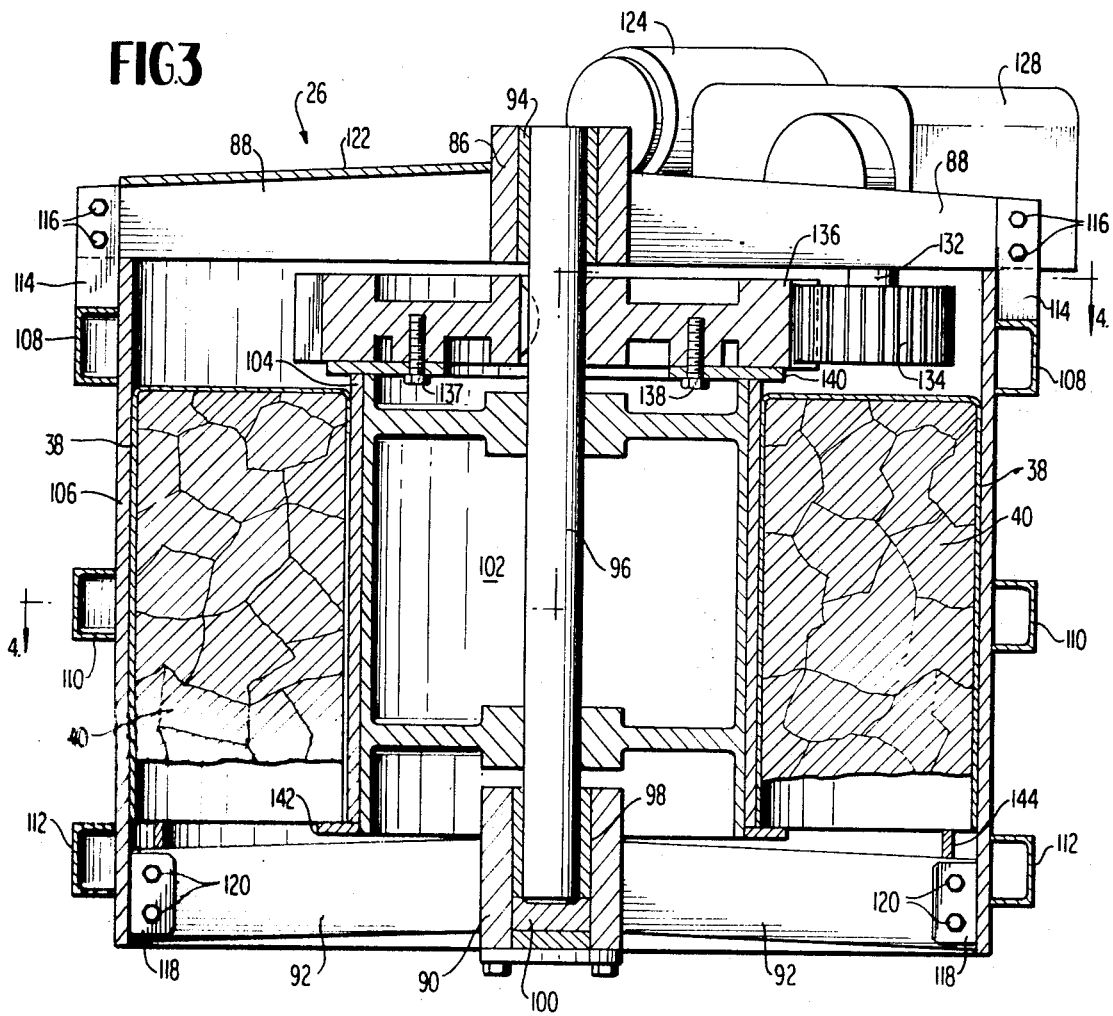
FIG. 3 is a vertical cross section through the resin crusher illustrated in FIGS. 1 and 2.
Figure 5:
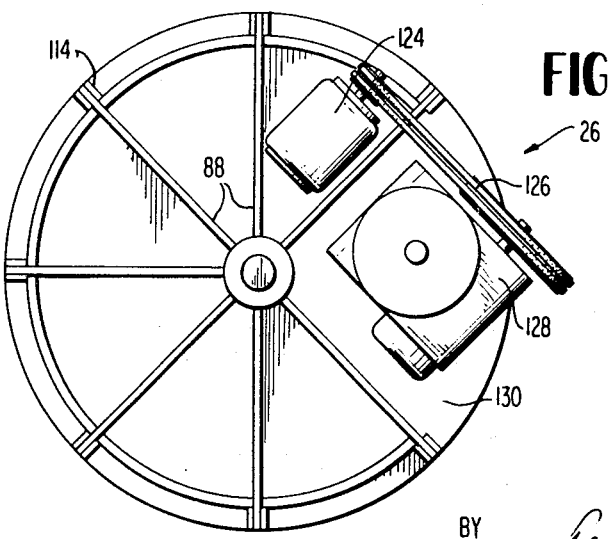
FIG. 5 is a plan view of the resin crusher showing the crusher drive motor and reduction gearing.

FIG. 3 is a vertical cross section through the planetary crusher 26 forming a principal component of the present invention and illustrates a pair of resin-filled drum containers being compressed in the crusher. FIG. 4 is a cross section taken along line 4—4 of FIG. 3 and FIG. 5 is a plan view of the crusher with the cover removed for the sake of clarity. The crusher comprises an upper central hub 86 connected to seven equally spaced and outwardly extending arms 88 to form an upper support spider. A lower support spider is formed by lower central hub 90 and eight equally spaced outwardly extending arm 92. Upper hub 86 supports a bearing 94 rotatably receiving the upper end of the central shaft 96. Lower hub 90 similarly supports bearings 98 and 100 rotatably receiving the lower end of shaft 96. Fixedly secured to and rotatable with shaft 96 is a hollow central drum 102 which has secured to its outer wall a cylindrical plate 104. The outer surface of plate 104 is preferably roughened for frictional engagement with the container drums 68 and forms one of the surfaces between which the drums are compressed.

Surrounding and spaced from plate 104 is an outer metal cylinder 106 which, if desired, may also have its inner surface roughened for frictional engagement with the fiber drum containers 68. Outer metal cylinder 106 is reinforced by three vertically spaced annular channels 108, 110, and 112 which are preferably welded to metal cylinder 106. The upper edge of metal cylinder 106 is slotted at equally spaced locations to receive the outer ends of spider arms or struts 88. These struts pass through the slots in cylinder 106 and between the arms of a bracket 114 welded to upper channel 108. Arms 88 are attached to brackets 114 by bolts, such as bolts 116 illustrated in FIG. 3. Spaced brackets 118 are also welded to the inner surface of metal cylinder 106 adjacent its lower end and these are connected by bolts 120 to the lower spider arms or struts 92.

Upper and lower spider arms 88 and 90 are in vertical alignment and are equally spaced approximately 45° about the rotational axis of central shaft 96. There are eight lower arms 92 but only seven upper spider arms 88. These spider arms 88 are enclosed by a cover 122 on which is mounted a 10 hp electrical drive motor 124. This motor is connected by drive belts 126 to a 50:1 gear reducer 128, as best seen in FIG. 5, mounted on a platform 130 secured to the adjacent spider arms 88. The eighth upper spider arm 88 is omitted to make room for the support platform 130 and cover 122 is provided with a 90° pie-shaped cutout to provide clearance for gear reducer 128 supported on the platform.

Gear reducer 128 is provided with a downwardly extending output shaft 132 (FIGS. 3 and 4) which carries a drive pinion 134. This pinion meshes with the teeth of a center gear 136 fixed to and rotatable with center shaft 96. Drum 102 is closed off by an annular top plate 137 welded to cylindrical plate 104 and connected to gear 136 by bolts 138. Plate 137 preferably extends outwardly beyond cylindrical plate 104 to define a top flange 140 which acts as a stop for the container drums 38 passing through the planetary crusher. A similar annular flange 142 welded to the lower end of cylindrical plate 104 forms a lower stop or inner rotary support for the container drums. Preferably an annular rim 144 is also provided, secured to the lower spider arms 92 to act as a radial outer support for the outer edges of the container drums 38 containing the resin 40.

In operation, the inverted resin-filled drums are fed by the apparatus 36 illustrated in FIG. 1 and described above to the inlet opening of the planetary crusher 26. Outer metal cylinder 106 and central reinforcing channel 110 are cutaway to provide a 45° feed aperture 70 through which the drums are manually pushed as illustrated by the arrow 148 in FIG. 4. The drums are pushed sufficiently into the machine to come into frictional engagement with the outer surface of inner cylindrical plate 104 and the inner surface of outer cylindrical plate 106. The frictional engagement causes the drums to be compressed and to rotate much in the manner of planetary gears with the outer cylinder operating as a stationary outer race and the inner cylinder as a movable inner race. As the fiber drums 38 rotate, they progress through the crusher, the inner drum rotating in the direction of the arrow 150 in FIG. 4, until they reach outlet aperture 152 provided by a second 45° cutaway in outer cylindrical plate 106 and central reinforcing channel 110. The empty fiber drums 38 are manually removed through exit aperture 152 as illustrated by the arrow 154 in FIG. 4.

The adjacent surfaces of inner and outer cylindrical plates 104 and 106 are preferably spaced by a distance of 19⅜ inches so as to be approximately one-fourth inch less than the outer diameter of fiber drums 38. As a result, the fiber drums are compressed with uniform compression applied along their entire lengths and are stressed to assume a slightly elliptical shape which is constantly distorted and progresses around the drum as the drum rotates in the crusher and advances from inlet aperture 70 in FIG. 4 approximately 215° to outlet aperture 152. As the fiber drum is compressed in passage through the crusher, the solid resin 40 cracks, breaks up and falls by gravity downwardly through the spaces between lower spider arms 92 into the hopper 74 of FIG. 2. Since the compression stresses are uniform throughout the entire length of the drum and since the forces are in effect continuously moving about the drum circumference as it rotates and progresses through the crusher, all of the resin in the drum is completely broken up and caused to fall by its own substantial weight out of the containers and into the hopper. By the time that the fiber drum containers reach the outlet aperture 152 of the planetary crusher, they are completely empty so that they may be readily lifted out and dropped into a suitable receptacle (not shown). Since the fiberboard material and the remaining annular metal band securing the bottom fiberboard cover to the container are quite resilient, the slight compression of the containers in passing through the planetary crusher causes little damage and most of the containers emerge from the planetary crusher in good condition and may be reused.

FIG. 6 is a partial vertical cross-sectional view similar to that of FIG. 3 showing a modified planetary crusher constructed in accordance with the present invention. The crusher illustrated in FIG. 6 is in all respects identical to that previously described with the exception that a removable metal liner 156, preferably having an inner roughened surface for frictional engagement with container drums, is illustrated as connected to the inner surface of the outer cylindrical plate 106 by a plurality of screws 158. By providing a removable liner 156, it is possible to vary the radial distance between the inner and outer crushing surfaces of the planetary crusher so as to accommodate container drums having different diameters. In all instances, the radial distance between the inner and outer crushing surfaces should be on the order of approximately one-eighth to three-eighths inch less than the outer diameter of the fiber container to be emptied.

It is apparent from the above that the present invention provides an improved method and apparatus for emptying containers and one that is particularly adapted for removing resinous materials from presently used fiberboard-type shipping containers to which the resins have a tendency to adhere. In particular, the present invention provides a novel planetary crusher and container feed system which is simple, reliable in operation, and which completely avoids the safety problem occasioned from flying resin which was a disadvantage in prior arrangements. At the same time, the emptying system insures complete sanitation and, in particular, makes it possible to completely empty the containers without causing any of the container fibers to become mixed with the resinous material. As previously stated, many resins exhibit the properties of being readily frangible at room temperature, but in some instances it may be desirable to slightly chill the resin before feeding it to the crusher to obtain the desired frangible or friable properties which permit the containers to be emptied in the crusher. Additional important features of the invention reside in the fact that the system provides rapid and continuous operation and results in many empty containers that are in excellent condition and completely reusable. The discharged particulate resin is passed through a secondary crusher 20 to further reduce the size of the resin particles before weighing and mixing with other ingredients.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A crusher for emptying flexible, cylindrical containers filled with friable material tending to adhere to the container walls comprising a generally vertically disposed outer cylinder having entrance and exit apertures for respectively receiving containers filled with the friable material and discharging substantially empty containers, an inner cylinder coaxially within said outer cylinder and spaced therefrom by a distance slightly less than the diameter of the containers to be emptied, means coupled to one of said cylinders for rotating said one cylinder relative to the other whereby the containers and friable material therein entering said entrance aperture rotate about axes generally parallel to the axes of said cylinders and are compressed between said cylinders as they pass through said crusher through said entrance aperture to said exit aperture, the lower ends of said cylinders defining a generally annular opening through which the friable material is discharged from the containers between said cylinders during their passage between said entrance and exit apertures, a plurality of radially extending spaced arms secured to the lower end of the other of said cylinders and carrying means rotatably supporting said one cylinder, whereby said friable material is free to fall from containers in said crusher by gravity between said arms and out of said crusher, and drive means for rotating said one cylinder.

2. Apparatus according to claim 1 wherein said rotating means is coupled to rotate said inner cylinder.

3. Apparatus according to claim 1 wherein the wall of at least one of said cylinders is roughened for frictional engagement with containers passing through said crusher.

4. Apparatus according to claim 1 including a removable liner attached to at least a portion of one of said cylinders to vary the spacing between cylinders for the accommodation of containers of different diameters.

5. Apparatus according to claim 4 wherein said liner comprises a plurality of curved plates secured to the inner surface of said outer cylinder.

6. A crusher for emptying cylindrical containers filled with friable material tending to adhere to the container walls comprising a stationary generally vertically disposed outer cylinder having entrance and exit apertures spaced about its periphery, a rotatable inner cylinder coaxial with but spaced from said outer cylinder by a distance slightly less than the diameter of the containers to be emptied, a spider having radially extending spaced arms secured to the lower end of said outer cylinder and including a hub rotatably supporting said inner cylinder, and drive means coupled to the upper end of said inner cylinder for rotating it relative to said outer cylinder.

7. Apparatus according to claim 6 including a feed chute for feeding generally horizontally disposed containers to said crusher and a tipping bar adjacent said entrance aperture for tipping containers about to enter said crusher into an orientation wherein the axes of the containers lie generally parallel to the axes of the cylinders.

8. Apparatus according to claim 7 including a feed belt adjacent said crusher for feeding containers to said chute.

9. Apparatus according to claim 6 wherein said entrance and exit apertures are each about 45° wide.

10. Apparatus according to claim 9 wherein said entrance and exit apertures are on centers spaced approximately 215° in the direction of rotation of said inner cylinder.

11. Apparatus according to claim 6 wherein said drive means comprises a gear coupled to said inner cylinder, and a drive motor and pinion coupled to said gear for driving said inner cylinder.

* * * * *